United States Patent
Hill et al.

(10) Patent No.: US 6,431,453 B1
(45) Date of Patent: Aug. 13, 2002

(54) AUTOMATED CARD INSERTION SYSTEM WITH CARD MULTIREADER AND METHOD

(75) Inventors: Jeffery L. Hill, Mundelein; Gregory L. Hill, Lake Zurich, both of IL (US)

(73) Assignee: Dynetics Engineering Corporation, Inc., Lincolnshire, IL (US)

( * ) Notice: Subject to any disclaimer, the term of this patent is extended or adjusted under 35 U.S.C. 154(b) by 0 days.

(21) Appl. No.: 09/081,306

(22) Filed: May 19, 1998

Related U.S. Application Data

(60) Provisional application No. 60/047,190, filed on May 20, 1997.

(51) Int. Cl.[7] ................................................. G06K 7/10
(52) U.S. Cl. ....................................... 235/475; 235/380
(58) Field of Search ................................. 235/375, 380, 235/379, 381, 488, 437, 489, 492–493; 902/26, 11; 156/64, 219, 277

(56) References Cited

U.S. PATENT DOCUMENTS

| | | | |
|---|---|---|---|
| 4,550,248 A | * 10/1985 | Hoppe et al. | ................ 235/492 |
| 4,876,441 A | * 10/1989 | Hara et al. | .................... 235/488 |
| 4,968,873 A | * 11/1990 | Dethloff et al. | |
| 5,012,074 A | * 4/1991 | Masada | ....................... 235/379 |
| 5,388,815 A | 2/1995 | Hill et al. | |
| 5,433,364 A | 7/1995 | Hill et al. | |
| 5,473,690 A | * 12/1995 | Grimonprez et al. | ......... 380/24 |
| 5,494,544 A | 2/1996 | Hill et al. | |
| 5,509,886 A | 4/1996 | Hill et al. | |
| 5,534,686 A | * 7/1996 | Kowalski et al. | ............ 235/492 |
| 5,541,395 A | 7/1996 | Hill et al. | |
| 5,581,065 A | * 12/1996 | Nishikawa et al. | ......... 235/492 |
| 5,585,787 A | * 12/1996 | Wallerstein | ............ 340/825.34 |
| 5,599,765 A | * 2/1997 | Ohshima et al. | ............ 503/227 |
| 5,757,918 A | * 5/1998 | Hopkins | ....................... 380/25 |
| 5,814,796 A | * 9/1998 | Benson | ........................ 235/375 |
| 5,923,015 A | * 7/1999 | Hill et al. | .................... 235/380 |
| 5,923,884 A | * 7/1999 | Peyret et al. | ................ 395/712 |

FOREIGN PATENT DOCUMENTS

WO 92/17856 * 10/1992

\* cited by examiner

*Primary Examiner*—Michael G. Lee
*Assistant Examiner*—Diane I. Lee
(74) *Attorney, Agent, or Firm*—Potthast & Associates; James W. Potthast

(57) ABSTRACT

A smart card verification insertion system (10) for inserting smart cards (30) into corresponding carriers (50) only after verifying the card data read with a mag stripe reader (72), an embossed character reader (74), an IC chip reader (64), and a first bar code reader (68) and a back bar code reader (70) and data encoded on the printed carrier read with a carrier reader (106) correspond to one another and also correspond to account data stored in a smart card account data memory (67). If it is determined that the card has been incorrectly prepared, an incorrect card reject mechanism (96) is actuated by a verification controller (66) in response to the mismatch. Similarly, if the data read by the carrier reader (106) does not match the data read from the card or retrieved from the smart card account data memory (67), a mismatch card reject mechanism (110) is actuated.

2 Claims, 4 Drawing Sheets

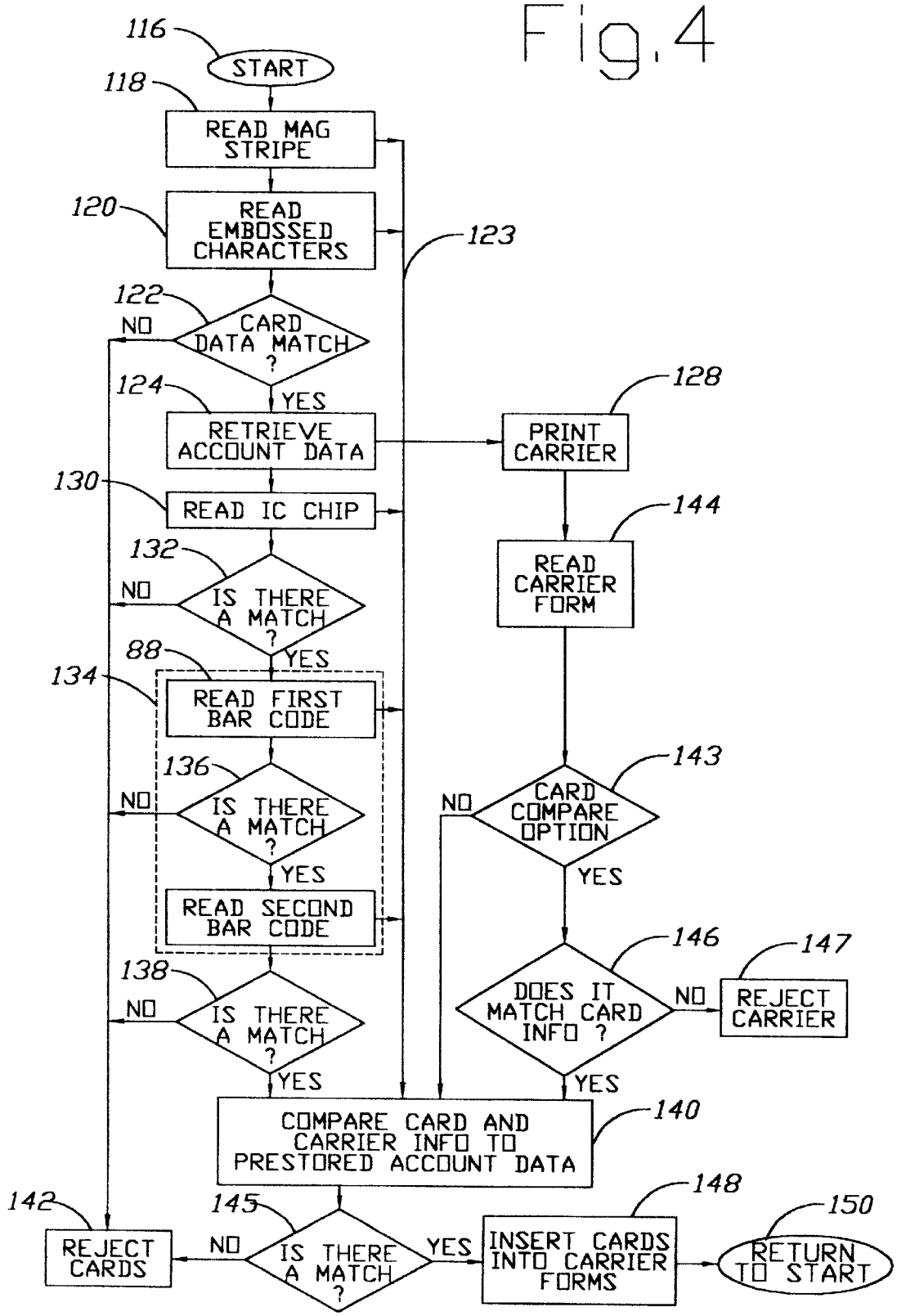

AUTOMATED CARD INSERTION SYSTEM WITH CARD MULTIREADER AND METHOD

CROSS-REFERENCE TO RELATED APPLICATION

This application claims the benefit of U.S. Provisional Application, No. 60/047,190, filed May 20, 1997, and entitled "Automatic Card Insertion System With Card Multireader and Method", the contents of which are incorporated by reference.

BACKGROUND OF THE INVENTION

1. Field of the Invention

This invention generally relates to card insertion systems and methods and, more specifically to card insertion systems and methods in which encoded data on the card or carrier are verified as to accuracy or as to matching one another.

2. Description of the Related Art

Referring to FIGS. 1A and 1B, the present invention is adapted to automatically insert so-called "smart" cards 30 to which are attached to each an integrated circuit chip, or IC chip, 32. The chip 32 protectively embedded in the card, as shown by broken line, but has two rows of four input/output electrical terminals, or contacts, 34 accessible on a front side 36 of the smart card 30, at a preselected IC chip terminal location, as shown in FIG. 1A.

The IC chip has encoded account information relating to a particular account such as a credit card account including the name of the account and the account number. The IC chips in commercial use are also known to include other information including the account address, the number of cards issued, the identification of the card issuer's name, etc. which are intended to be permanently stored. In addition, the smart card chip 32 has pre-encoded information such as account balance, credit limits, etc. which are altered during use after issuance.

The smart card 30 also includes the account number 38, the account name 40 and, optionally, the account address embossed on the card in embossed alphanumeric characters. Other information, now shown, such as expiration date, year of account opening, etc. is also sometimes embossed on the smart card 30, all at different data locations on the card.

In addition, the smart card includes the account number encoded in bar code 44, on the front 36, or encoded in bar code 46 on the back 45 of the smart card 30 or on both the front 36 and the back 46 at different locations on the card spaced from each other and from the other card data locations.

Further, as seen in FIG. 1B, the smart card 30 includes a magnetic strip, or mag stripe, 48 at another data location on the back 45 which has pre-encoded account information including account name, account number, etc.

Referring now to FIGS. 2A and 2B, the automatic card insertion system of the present invention selective mounts the smart cards 30 of FIGS. 1A and 1B to carrier forms, or carriers, 50 to form smart card packages 51. As best seen in FIG. 2A, the carrier forms include account information including the account number encoded in bar code 52. The carrier form 50 also has the account name and address printed on the carrier at one or more carrier print locations 54 and 56. As seen in FIG. 2A, the carrier form 50 is folded to protectively cover the mounted card 30 to form a card package 51 suitable for mailing in a standard see through envelope through which the account name and address on the carrier can be read.

It is of the utmost importance that incorrectly pre-encoded cards not be sent out to the account owners or that correctly prepared cards not be inserted into carrier forms 50 which do not have account numbers at bar code 52 which match the account number of the card. For this reason, it is known to compare the account number read from the carrier 50 at bar code 52 with the account number read from the embossed characters 38 of the card 30 or at the magnetic stripe 48. It is also known to compare the account data read form the card 30 with prestored account data stored apart from the card and the carrier which is used to encode the card data to confirm that the card has been correctly prepared.

While these known card insertion systems work successfully, they lacked a certain degree of versatility. In U.S. Pat. No. 5,494,544 noted above, all data read from the card was required to be compared not only with the account data stored in memory but also with each other and with the account data read from the card. Even if a user desired to eliminate some of the comparisons being made to enhance processing speed or speed of operation, selective elimination of comparison steps was not possible.

Another shortcoming of known insertion systems which functioned with pre-encoded smart cards is that no means is provided to either read the IC chip 32 or to compare data read from the IC chip with any other data either stored in an account data memory or read from other data locations on the card 30 or read from the carrier 50. Accordingly, in known systems, there is nothing to prevent inserting a pre-encoded smart card 30 into a carrier 50 which has account data encoded in the IC chip 32 that does not match account data read from the other data locations on the card 30 or which does not match the data read from the carrier. In addition, it is unknown also to read bar code at both bar code locations 44 and 46 for verification purposes.

SUMMARY OF THE INVENTION

It is therefore the principle object of the invention to provide an automatic card insertion system for inserting smart cards into carriers with a verification system, having means for reading encoded information stored in an integrated circuit computer chip carried by each of the cards to be inserted; and means for determining whether a card has been correctly prepared for insertion into a corresponding carrier including means responsive to the chip reading means for deciding whether the information stored in the chip has been correctly encoded, and means responsive to the determining means for rejecting incorrect cards.

Also, the object of the invention is obtained by providing a method of automatic verification in an automatic card insertion system for inserting smart cards with integrated circuit computer chips carried by the cards, comprising the steps of (a) reading encoded information stored in an integrated circuit computer chip carried by each of the cards to be inserted (b) deciding whether the information stored in the chip has been correctly encoded in response to the chip reading means and (c) rejecting cards decided to have been incorrectly prepared.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 4 is an algorithm, or logical flow chart, of the computer program used to operate the computer of the verification controller of FIG. 3 to achieve the objectives of the invention.

DETAILED DESCRIPTION OF THE PREFERRED EMBODIMENT

Figure 1A:
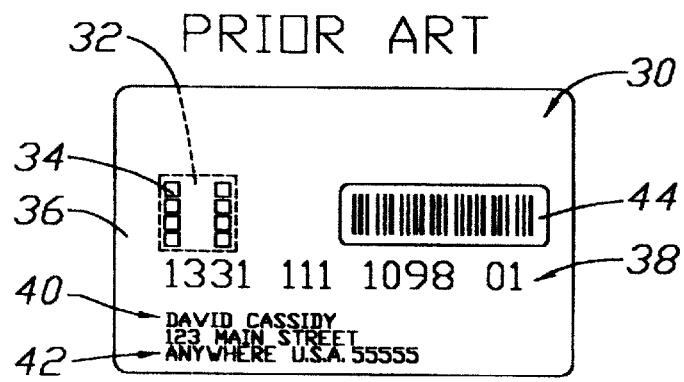
FIG. 1A is a front elevational view of a prior art smart card.
Figure 1B:
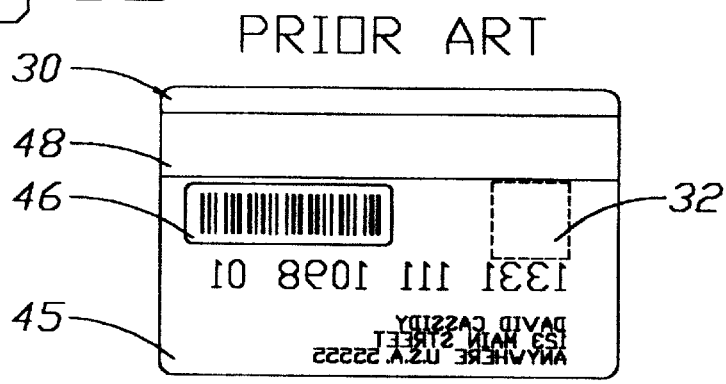
FIG. 1B is a back elevation view of the prior art smart card of FIG. 1A.
Figure 2B:
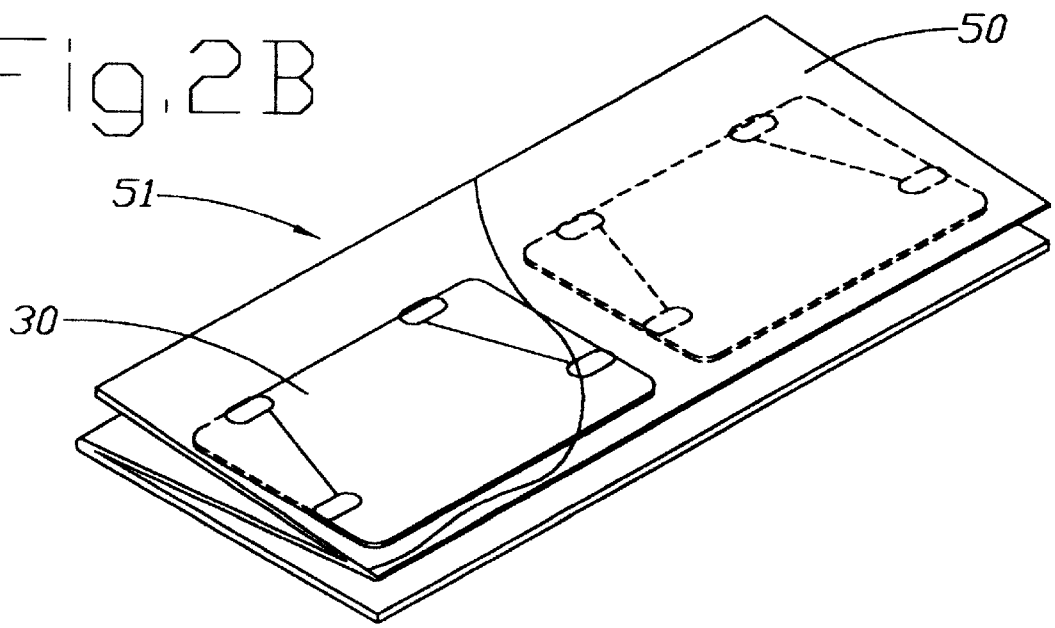
FIG. 2B is a perspective view of the prior art of the carrier form of FIG. 1B with two cards 30 inserted and the carrier folded into a card package.
Figure 2A:
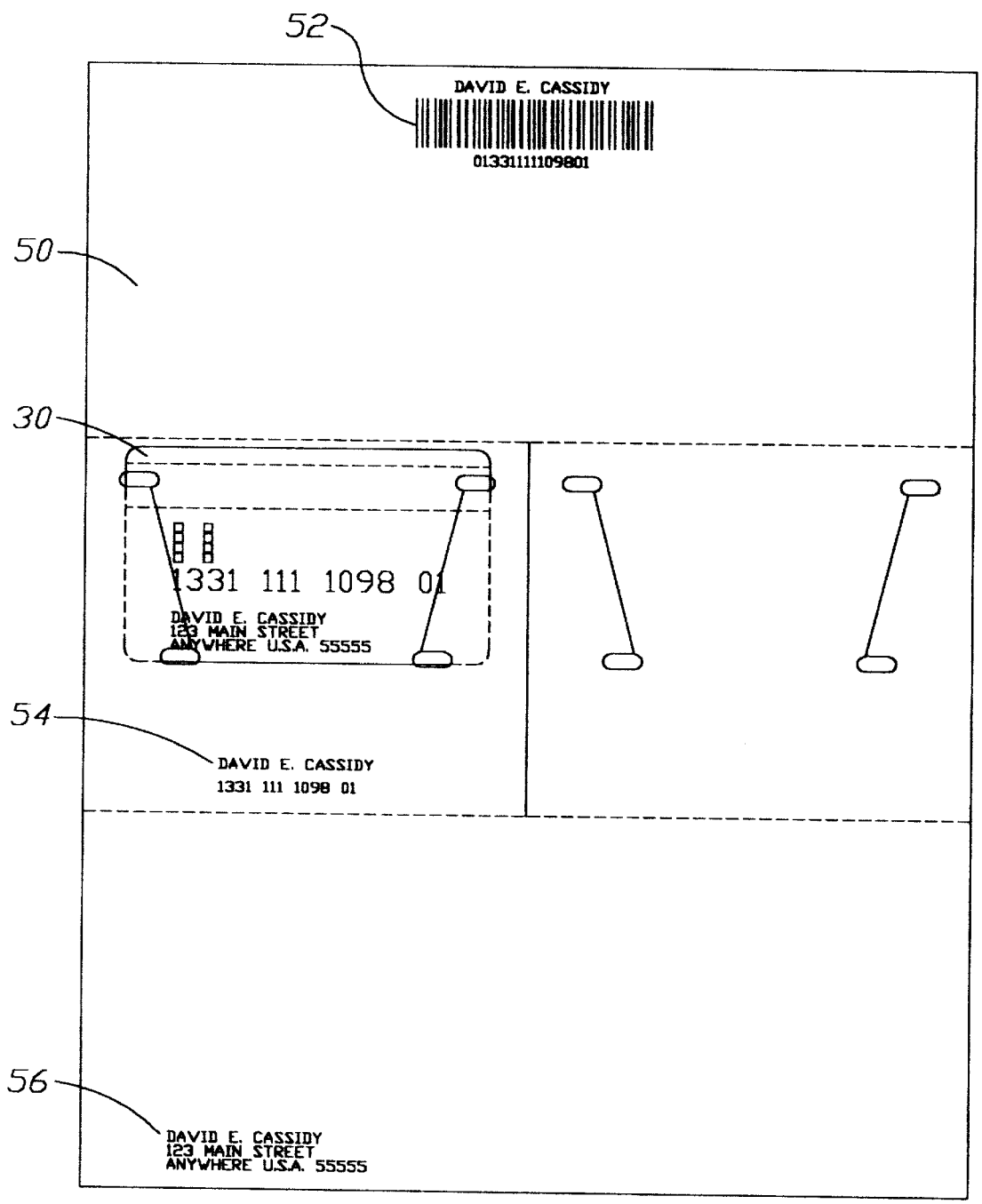
FIG. 2A is a prior art carrier form with a smart card 30 inserted into the carrier form in one of the two card pockets.
Figure 3:
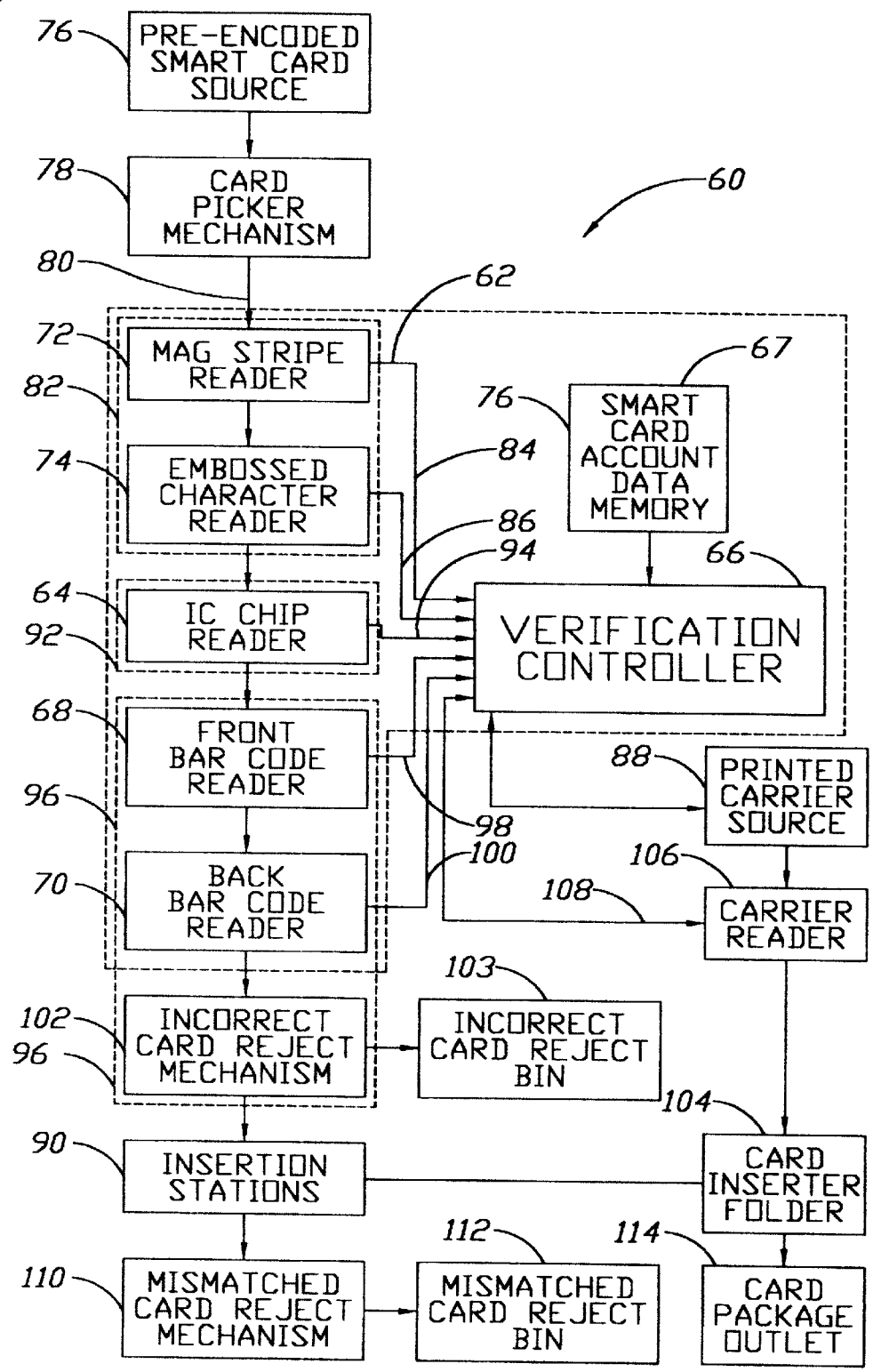
FIG. 3 is a functional block diagram of the preferred embodiment automatic card insertion system of the present invention.

FIG. 3 is a functional block diagram of the preferred embodiment of the automatic card insertion system, or smart card verifying inserter, 60 of the present invention which is employed to insert pre-encoded smart cards 30 described above with respect to FIGS. 1A and 1B into carriers 50 to form card packages 51 as described with reference to FIGS. 2A and 2B. Advantageously, unlike known verification inserters, the automatic card insertion system 60 includes a smart card verification system 62 which, among other capabilities, has an IC chip reader 64 capable of reading pre-encoded chips 32 on the cards 30 and a verification controller 66 with an associated smart card account data memory 67 capable of responding to the IC chip reader 64 to determine if the IC chip 32 has been correctly pre-encoded. In addition to the IC chip reader 64, the smart card verification system 62 advantageously also includes a first, front bar code reader 68 for reading the bar code 44 on the front side 36 of the smart card 30, FIG. 1A, and second back bar code reader 70 for reading the bar code 46 on the back side 45 of the card 30, FIG. 1B. The verification system 62 also includes a mag stripe reader 72 for reading the account information encoded on a magnetic stripe 48, FIG. 1B, and an embossed character reader 74. During operation, a supply of pre-encoded smart cards 30 at a pre-encoded smart card source 76, such as smart card hopper, are transported, one card at a time, by a card picker mechanism to a card track transport mechanism, schematically illustrated by the solid arrows interconnecting the various cards and subsequent mechanisms. The details of the card track 80 form no part of the present invention but reference can be made to co-pending U.S. provisional patent application Serial No. 60/047,189 (DYN-15) of Hill et al. entitled "Card Package Production System With A Multireader Card Track and Method" hereby incorporated by reference contemporaneously filed herewith and assigned to the assignee of this application for the mechanical and electrical details of the card track 80 and movement of the cards 30 along the card track 80 and past the various card readers.

However, in the preferred embodiment, the transport mechanism 80 transports the cards 30 from card picker mechanism 78 to a first reading station 82 at which are located both the mag stripe reader 72 and the embossed character reader 74. The account data or account information read by the mag stripe reader 72 is passed to the verification controller 66 via a lead 84 indicated by a broken line arrow to distinguish it from the path of the card being moved by the card transport mechanism 80. Likewise, the embossed character reader 74 passes the embossed character information to the verification controller 66 via a lead 86. In keeping with one aspect of the invention, the encoded account information read by reader 72 and the embossed character reader 74 are passed concurrently to the verification controller 66. In accordance with another aspect of the invention, if there is a match between the account information read from the mag stripe reader 72 and the embossed character reader 74 at the first read station, the verification controller 66 polls corresponding carrier print information from the smart card account data memory and uses this information to control a carrier form printer, or carrier source, 88, such as a single sheet printer, to print carrier account information on the carriers 50 as shown in FIG. 2A. This insures that the carrier will be printed in sufficient time to receive the card when the card is received at an insertion station 90. The carrier form 50 is printed while the data from other locations is being read. The card 30 then passes from the first read station 82 to a second read station 92 at which is located only the IC chip reader 64. The encoded account data in the IC chip 32, FIGS. 1A and 1B, which are read by the IC chip reader 64 are passed via a lead 94 to the verification controller 66. The information from the IC chip reader on lead 94 is selectively compared with the information read from the mag stripe reader 72 and the embossed character reader 74 and with the account data stored in the smart card account memory 67 to determine if there is a match.

Next, the card 30 is transported from the second reading station 92 to a third reading station 96 at which are located both the front bar code reader 68 and the back bar code reader 70. The front bar code reader 68 passes the read bar code encoded information to the verification controller 66 via a lead 98, and the back bar code reader 70 passes the encoded account data to the verification controller 66 via a lead 100. Again, the verification controller 66 selectively compares the information read from the front bar code reader 68 and the back bar code reader 70 with the information read from the IC chip reader 64 and the mag stripe reader 72 and the embossed character reader 74, selectively, and also compares each of the account data read from each of the readers with corresponding data in the smart card account data memory 67 correspond to the data stored in the IC chip 32. If it is determined that the smart card 30 has been incorrectly prepared because of any of the encoded information at any of the encoded information locations does not match, the corresponding information in the smart card account data memory corresponding to the information of the IC chip 32, or if there is not a match between the account information from the several readers, the card is rejected, or removed, from the card transport mechanism by an incorrect card reject mechanism 102. As seen in FIG. 3, the incorrect card reject mechanism is located at the third read station 96 at which are also located the front bar code reader 68 and the back bar code reader 70. If the card has not been determined to be incorrect encoded, i.e. to be a "bad" card, then it passes from the third read station 96 to one of two insert stations 90 at which the card inserter-folder 104 functions to insert the correct card or cards 30 into one or both of the card locations or pockets shown in FIG. 2A. Otherwise, the incorrect card reject mechanism 102 will pass the rejected bad card cards to an incorrect reject bin 103.

The printed carrier source, such as a carrier printer, or a source of preprinted carriers provides carrier forms with preprinted account data encoded at the bar code 52, FIG. 2A, which is read by a carrier bar code reader 106. The encoded data from bar code 52 is passed from the bar code carrier reader 106 to the verification controller 66 via a lead 108.

The verification controller 66 selectively compares this carrier account data received from the carrier reader 106 with the data read from the plurality of other card data readers and selectively with the corresponding data stored in the smart card account data memory corresponding to the account data in the IC chip 64. If the information read from the carrier 50 does not correspond to the information read from the card readers or to the data in the smart card account data memory 67 corresponding to the account data in the IC chip and read by IC chip reader 64, then the cards 30 are transported past the insertion stations 90 to a mismatched card reject mechanism 110 which passes the mismatched cards to a mismatched card reject bin 112.

Cards 30 which are correctly prepared and which have corresponding correctly prepared carriers 50 are inserted into their matching carriers at the card inserter 104 and folded to form card packages as shown in FIG. 2B which are passed to a card package outlet 112. The mechanical details of the inserter folder 104 forms no part of the present invention, but reference can be made to U.S. provisional patent application Serial No. 60/047,195 (DYN-11) of Hill et al. entitled "Card Package Production System With A Multireader Card Track and Method" and U.S. provisional patent application Serial No. 60/047,189 (DYN-15) of Hill et al. entitled "Card Package Production System With A Multireader Card Track and Method", hereby incorporated by reference, and which have been contemporaneously filed herewith. Reference may also be made to U.S. patent applications noted below for other details of the insertion system to the extent they are not described in detail or described differently here.

Preferably, the verification controller 66 comprises a Pentium computer, while the smart card account data memory 67 is a computer data memory such as stored on a computer disk which contains all the information for printing carriers and storing encoded account information stored in the IC chips 32. As previously noted, the printed carrier source 88 is preferably a printer for printing the carriers 50 in which case the carrier information contained in the smart card 30 is accessed by the verification controller 66 to control the printed carrier source 88, or printer, to print the carrier with the information corresponding to the data encoded on the cards 30 to be inserted into the carrier. The details of the printed carrier source 88, or printer, or other preprinted carrier source provider such as a burster for producing single sheet preprinted carriers from a continuous fan-folded supply, the carrier bar code reader 106, the card inserter-folder 104, the incorrect card reject mechanism 96, the mismatched card reject mechanism 110 or the card picker mechanism 78 form no part of the present invention. Reference may be made to the U.S. patents noted below-for examples of suitable devices for performing the functions of these various apparatus. Preferably, however, the details of the card transport mechanism 80, the card reject mechanisms, the details of the IC chip reader 64 and the card inserter and card picker mechanism are shown in the aforementioned co-pending U.S. patent applications noted below hereby incorporated herein by reference contemporaneously filed herewith and assigned to the same assignee as the present application. In addition, a verification system can include means for performing other operations or functions such as shown in U.S. Pat. No. 5,494,544 issued Feb. 27, 1996 to Hill et al. and entitled "Automatic Verified Embossed Card Package Production Methods".

Referring to FIG. 4, in the preferred embodiment of the present invention, the computer of the verification controller 66 is provided with a software program for controlling the card inserter-folder 104 as well as the incorrect card reject mechanism 96 and the mismatched card reject mechanism 110 in response to the account information obtained from the plurality of card readers 72, 74, 64, 68 and 70, as well as the carrier reader 106. After commencement of the program at the start 116, the verification controller reads the magnetic stripe 48 with the mag stripe reader 72 in step 118. Next, in step 120, the embossed characters 38 are read by the embossed character reader 74 in step 120. In step 122, if there is a match between the account data encoded in the mag stripe 48 and the embossed characters 38, the computer retrieves the corresponding account data in step 124 needed to print the carrier 50 and the printer is directed to commence printing in step 128. In addition, if optionally selected, the mag stripe and embossed characters are compared to the corresponding smart card account data in step 123.

While the carrier 50 is being printed, the card 30 proceeds along the card path by transport mechanism 80 to the second read station 92 where the IC chip reader 64 reads the IC chip 32 in step 130. In step 132, a determination is then made if there is a match between the account data read from the chip in step 130 and the account data read during steps 118 and 120. In addition, selectively the computer determines also if there is a match between the data read from the IC chip 32 in step 130 with the mag stripe and embossed character data read during steps 118 and 122. In step 132, if there is a match, the card is passed to the third read station 96 at which the front bar code 44 and back bar code 46 are respectively read by the front bar code reader 68 and the back bar code reader 70 in step 134. In step 136, if there is a match between the various codes read from the card, then the bar codes read from the front and back of the card are again compared with the corresponding smart card data stored in the smart card account data memory 67 in step 138. In step 138, if there is not a match between the data read from the various data locations on the card 30, the verification controller 66 causes the incorrect card reject mechanism 102 to reject the card in step 142. Likewise, in steps 122, 126, 132 if a determination is made that there is not a match, the verification controller 66 functions to actuate the incorrect card reject mechanism 102 at the appropriate time to reject the incorrectly prepared card.

After the carrier is printed in step 128, in step 144 the carrier form 50, FIG. 2A, specifically the bar code 52, is read in step 144. In step 143, if the card compare option is selected, then the program proceeds to step 146. In step 146, if a determination is made that there is not a match between the bar code data read from the bar code 52 and selectively any one of the encoded data from the card from any of the card readers, the mismatch card reject card mechanism 110 is actuated by the verification controller 66 in step 146. In step 146 the incorrectly or mismatched carrier is also rejected in step 147. In step 145, if there is a match between carrier and the data encoded at all the data locations on the card 30, a comparison is made with the smart account data stored in the smart card account data memory 67 to determine if there is a match with this data. Between the carrier, the card data and the stored smart card account data in step 140, the card 30 is inserted into the correct form in step 148. After the card is inserted, the program returns to the start 116 in step 150.

While the option selectors are not indicated as a step in the flow chart, in fact, the operator can preselect the degree of verification required by selecting options on the computer. Account information from the card readers are selectively compared to the information, read from the other card readers, to the account data computers to the account data in the IC chip 32 and stored in the smart card account data memory 67 or to the account data read from the carrier 50. One, two or all three comparisons are made depending upon the option preselected.

It should be appreciated that to the extent the details of the various apparatus referred to or shown herein are not described or shown herein, they form no part of the present invention. If such details are desired, reference should be made to one or more of U.S. Pat. No. 5,388, 815 issued Feb. 14, 1995 to Hill et al. entitled "Embossed Card Package Production System With Modular Inserters For Multiple Forms"; U.S. Pat. No. 5,433,364 issued Jul. 18, 1995 entitled "Card Package Production System With Burster and Carrier Verification Apparatus"; U.S. Pat. No. 5,494,544 issued on Feb. 27, 1996 to Hill et al. entitled "Automatic Verified Embossed Card Package Production Methods"; U.S. Pat. No. 5,509,886 issued Apr. 23, 1996 to Hill et al. entitled "Card Package Production System With Modular Carrier Folding Apparatus For Multiple Forms"; and U.S. Pat. No. 5,541,395 issued Jul. 30, 1996 to Hill et al. entitled "Card Package Production System With Burster and Code Reader. Reference should also be made to U.S. patent application Ser. No. 08/313,548 filed Sep. 23, 1994 (which is a continuation of filewrapper of Ser. No. 08/036,436 filed Mar. 24, 1993) of Hill et al. entitled "Card Carrier Forms For Automated Embossed Card Package Production System"; U.S. provisional patent application Serial No. 50/047,195 (DYN-11) of Hill et al. entitled "Card Inserter With Carrier Folding Apparatus and Method" filed contemporaneously herewith; U.S. patent application Ser. No. 08/859,685 (DYN-13) of Hill et al. entitled "Inserter Module Adaptable For Use With Both Preprinted and In-Line Printed Carriers and Method" filed contemporaneously herewith; U.S. patent application Ser. No. 08/859,295 (DYN-14) of Hill et al. entitled "Printer With Discrete Sheet Load Enhancement Apparatus and Method" filed contemporaneously herewith; and U.S. provisional patent application Serial No. 60/047, 189 (DYN-15) of Hill et al. entitled "Card Package Production System With A Multireader Card Track and Method" filed contemporaneously herewith. All these patents and patent applications are hereby incorporated by reference.

While a detailed description of the preferred embodiment of the invention has been given, it should be appreciated that many variations can be made thereto without departing from the scope of the invention as set forth in the appended claims.

What is claimed is:

1. In an automatic card insertion system for inserting into carriers, smart cards, each having a card body with machine readable account information on the body, and an integrated circuit computer chip permanently mounted to the card body and containing account information corresponding to that of the machine readable account information on the body, a forms memory for storing, apart from the chip, the card and the carrier, carrier information used to print carrier data on the carriers corresponding to the encoded information stored in the chip, the improvement being a verification system, comprising:

means for reading encoded information stored in an the integrated circuit computer chip carried by each card of the smart cards to be inserted; and means for determining whether a smart card has been correctly prepared for insertion into a corresponding carrier including means responsive to the encoded information stored in the integrated circuit computer chip reading means for deciding whether the information stored in the chip has been correctly encoded, means responsive to the deciding means for rejecting incorrect cards; and means responsive to the determining means for inserting correctly prepared cards into a matching carrier with printed carrier information corresponding to that of the chip, said means for determining includes means for comparing the encoded information read from the chip with the corresponding carrier information stored in the forms memory to determine if there is a match, said determining means determining that the card is incorrect if there not a match, means for reading magnetic stripe information encoded on a magnetic stripe carried by each card, and in which said determining means includes means responsive to the magnetic stripe reading means for comparing the magnetic stripe information read from each card with carrier information stored in the forms memory corresponding to the encoded information stored in the chip of the card being used, a card transport mechanism for moving the card along a card track, and said magnetic stripe information reading means includes a magnetic stripe read head, means for releasably mounting the magnetic read head in the one position to enable the read head to read magnetic stripe information from one side of the cards, and means for mounting the magnetic read head in another position relative to the card track to read magnetic stripe information from another side of the cards which is opposite said one side.

2. A method of automatic verification in an automatic card insertion system for inserting into carriers, smart cards, each with a card body having machine readable account information on the body, and an integrated circuit computer chip permanently mounted to the card body and containing account information corresponding to that of the machine readable account information on the body, comprising the steps of:

reading encoded information stored in the integrated circuit computer chip carried by each of the cards to be inserted;

deciding whether the information stored in the chip has been correctly encoded in response to the chip reading means;

rejecting smart cards decided to have been incorrectly prepared; and inserting into a matching carrier smart cards decided to have been correctly prepared carriers with printed carrier information corresponding to that of the chip, storing in a forms memory, apart from the chip, the card and the carrier, carrier information used to print carrier data on the carriers corresponding to the encoded information stored in the chip, comparing the encoded information read from the chip with the corresponding carrier information stored in the forms memory to determine if there is a match, said determining means determining that the card is incorrect if there is not a match, reading magnetic stripe information encoded on a magnetic stripe carried by each card, and comparing the magnetic stripe information read from each card with carrier information stored in the forms memory corresponding to the encoded information stored in the chip of the card being used, moving the card along a card track by means of a card transport mechanism, reading magnetic stripe information with a magnetic stripe read head, releasably mounting the magnetic read head in one position to enable the read head to read magnetic stripe information from one side of the cards, and mounting the magnetic read head in another position relative to the card track to read magnetic stripe information from another side of the cards which is opposite said one side.

* * * * *